US006205651B1

(12) United States Patent
Warner (10) Patent No.: US 6,205,651 B1
(45) Date of Patent: Mar. 27, 2001

(54) DOOR PANEL MOLDING INSTALLATION MACHINE

(76) Inventor: Joseph H. Warner, 330 W. Champaign Ave., Rantoul, IL (US) 61866

( * ) Notice: Subject to any disclaimer, the term of this patent is extended or adjusted under 35 U.S.C. 154(b) by 0 days.

(21) Appl. No.: 09/277,873

(22) Filed: Mar. 29, 1999

(51) Int. Cl.[7] .............................. B23P 21/00; B23P 19/04
(52) U.S. Cl. ................................................ 29/706; 29/235
(58) Field of Search ........................... 29/235, 706, 707, 29/450, 451, 270, 278

(56) References Cited

U.S. PATENT DOCUMENTS

| 2,638,131 | * | 5/1953 | Rohs | 29/235 |
|---|---|---|---|---|
| 2,646,617 | * | 7/1953 | Turoff | 29/235 |
| 2,695,445 | * | 11/1954 | Johnson et al. | 29/417 |
| 2,924,007 | * | 2/1960 | Wrightfield | 29/235 |
| 2,931,096 | * | 4/1960 | Brudney | 29/235 |
| 4,172,313 | * | 10/1979 | Takahashi | 29/235 |
| 4,899,429 | * | 2/1990 | Londono | 29/235 |
| 5,052,093 | * | 10/1991 | Urlacher | 29/235 |
| 5,068,952 | * | 12/1991 | Hennen | 29/235 |
| 5,121,532 | * | 6/1992 | Massie | 29/235 |
| 5,237,741 | * | 8/1993 | Goedderz | 29/235 |
| 5,243,747 | * | 9/1993 | Mesnel et al. | 29/235 |
| 5,274,895 | * | 1/1994 | Mesnel et al. | 29/235 |
| 5,345,662 | * | 9/1994 | Gosselin et al. | 29/235 |
| 5,735,032 | * | 4/1998 | Stone | 29/235 |

* cited by examiner

Primary Examiner—I Cuda Rosenbaum
Assistant Examiner—Marc Jimenez
(74) Attorney, Agent, or Firm—Knechtel, Demeur & Samlan (57) ABSTRACT

A machine for automatically installing a molding strip onto the edge of a door panel. The door panel is covered with a soft, flexible material such as vinyl or cloth. The molding strip has a channel formed therein, which receives the edge of the door panel. A compression mechanism compresses the material in front of the molding strip as the molding strip is pushed by a drive mechanism onto the door panel edge the distance of the molding strip. The compression mechanism and the drive mechanism move in unison so that the compression mechanism is continuously compressing the material just in front of the molding strip as the strip is installed on the door panel edge.

12 Claims, 9 Drawing Sheets

DOOR PANEL MOLDING INSTALLATION MACHINE

BACKGROUND AND SUMMARY OF THE INVENTION

This invention relates to machinery used to automate the production of automobile parts and more particularly to a method and apparatus for installing moldings to automobile door panels.

The inside of automobile door panels are generally formed of a plastic material and covered in cloth or vinyl material. In addition various trims made of metal, plastic or wood are added. The top portion of the door panel has a large opening to accommodate the window. The top edge of the door panel usually has a molding strip placed over the top edge to keep the cloth or vinyl material in place and to provide a cushion between the window and door panel. The molding strip also aids in keeping the window in its proper place when the window moves up or down in the window tracks inside of the door panel.

In the past, the door panel molding was installed by hand. The molding strip was lubricated with a slippery substance, usually soap, and positioned at one edge of the door panel. The strip was spread apart so that the door panel would fit inside of a channel at one end of the molding. The opposite end of the molding was then manually hit with a mallet until the molding was slid over the entire length of the door panel. The installation process took about one minute to complete per door panel. The installer had to be careful to continually guide the molding over the cloth or vinyl material so that the door panel stayed in the channel in the molding and at the same time had to be carefull not to tear the cloth or vinyl. If the cloth or vinyl tore, the panel was ruined.

Applicant recognized that a need existed for an improved method and apparatus for installing moldings to door panels in the automotive industry. The previous method was labor intensive and slow. It also resulted in ruined door panels as a result of tearing the cloth or vinyl material. In the highly competitive automotive industry, a machine was needed that would install the moldings to the door panels at greater speed and at less cost.

Applicant's invention comprises a new and unique method and apparatus for installing molding strips to the door panels on automobiles. The machine holds the door panel in place. A molding strip is manually placed in position and the machine automatically pushes it along the door panel into the final installed position. There is a mechanism to maintain pressure along the vinyl or cloth material at the proper points to keep the vinyl or cloth from bunching up in front of the molding strip as it is slid along the door panel. This minimizes the possibility of tearing the vinyl or cloth. The machine automatically resets so that after one molding strip is installed and the door panel removed, the machine is ready to begin another cycle. The machine is simple and efficient in design, easy to operate, and easy to maintain. The machine installs a molding strip onto the door panel in about 15 seconds, which is a substantial timesaving over the prior method.

OBJECTS AND ADVANTAGES OF THE INVENTION

Thus it is an object of the invention to provide a method and apparatus for automatically installing door panel moldings to door panels.

It is a related object to provide an apparatus that installs door panel moldings at a greater speed than was previously possible by the manual process.

Another object is to provide an apparatus that automatically installs door panel moldings while minimizing the possibility of tearing the vinyl or cloth on the door panel while installing the molding.

Yet another object is to provide a method and apparatus to apply pressure to the proper locations on the cloth or vinyl material to automatically install door panel moldings over the door panel without catching or binding upon the cloth or vinyl.

These and other objects and advantages will be apparent from the Description of the Drawings and Description of the Preferred Embodiment.

DESCRIPTION OF THE PREFERRED EMBODIMENT

Figure 1:
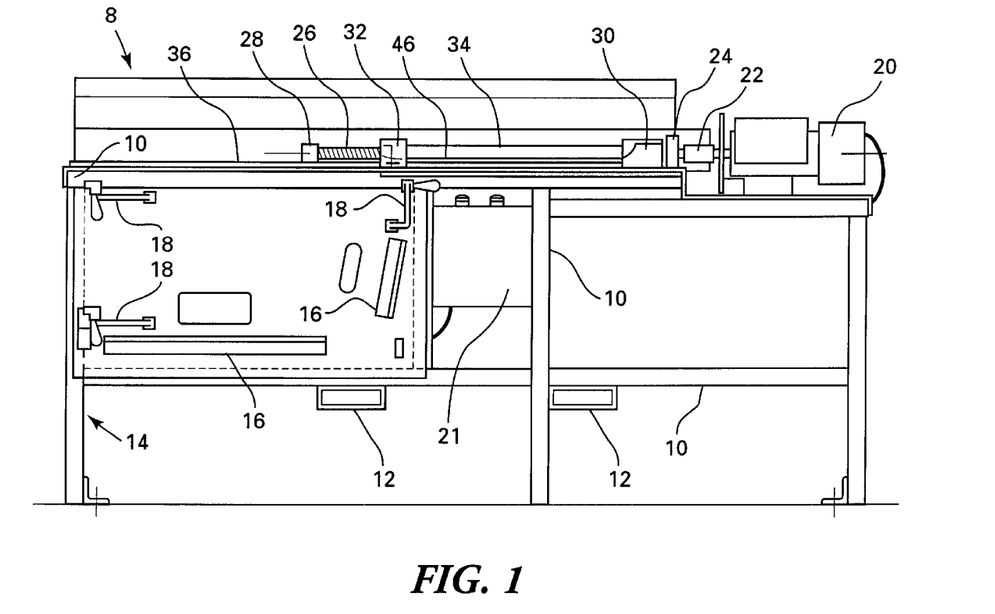
FIG. 1 is a front elevation view of the molding installing machine.

Turning first to FIG. 1 there is illustrated a door panel molding installation machine 8 of the present invention. The machine 8 has a tubular steel frame 10, which forms the structural support for the entire machine. There is a pair of forklift tubes 12 by which the machine 8 can be lifted and moved. However once the machine is properly located, it is intended to remain stationary.

The machine is designed to receive a car door inner panel 9, which is securely held in place by several panel supports 16 and clamps 18. The operator of the machine 8 positions the door panel 9 on the supports 16 and locks the panel to the frame 10 at the beginning of the installation cycle and unlocks the panel upon completion of the cycle.

On the top of the frame 10 is mounted a reversible electric motor 20. An electric control panel 21 provides the controls and power to the motor 20 to operate it at the proper times and in the correct direction. The output shaft of the motor is connected to a coupling 22, which in turn is connected to a shaft, which passes through a bearing 24. This in turn is connected to a screw drive 26 which has its end supported in an end bearing 28. The screw drive is a one inch diameter ball bearing screw shaft.

There is a push block 30 mounted at the motor end of the screw drive 26. The push block 30 has a threaded passageway that receives the screw drive 26. The screw drive rotates four turns to move the push block 30 one inch. A guide block 32 is mounted on the top of the frame 10 near the end bearing 28, which is also located above where the door panel is mounted. Spacer tubes or pipes 34 connect the guide block 32 and push block 30 to each other. The spacing between the push block 30 and guide block 32 can be adjusted by adjusting the length of the spacer tubes. Thus as the push block 30 is driven by the screw drive 26, the guide block 32 is simultaneously driven a like distance. The push block 30 and guide block 32 rest on a block rail 36, which is mounted to the top of frame 10. The block rail 36 can be of many designs but it is important that it maintains the push block 30 and guide block 32 in a straight line while allowing the blocks to move freely along their travel in either direction. In the preferred embodiment the block rail 36 has a pair of ball bearing block assemblies mounted on it. The push block 30 and guide block 32 are mounted on the ball bearing block assemblies so that they can move freely.

Figure 2:
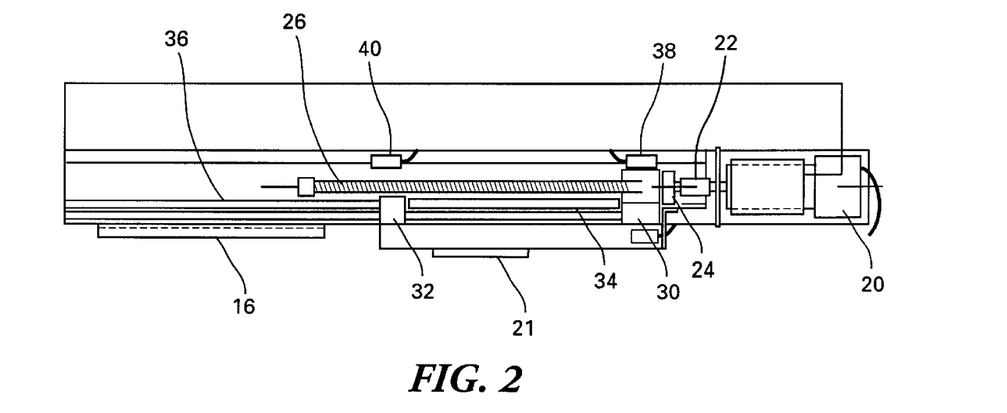
FIG. 2 is a top plan view of the machine.

As seen in FIG. 2, a pair of limit switches 38 and 40 control the length of travel of the push block 30 by sending signals to the control panel 21 when tripped by the movement of the push block 30 and guide block 32. The exact length of travel, location of stopping and reversing of the push block 30 and guide block 32 can be adjusted by adjusting the point where the limit switches are activated.

Figure 3:
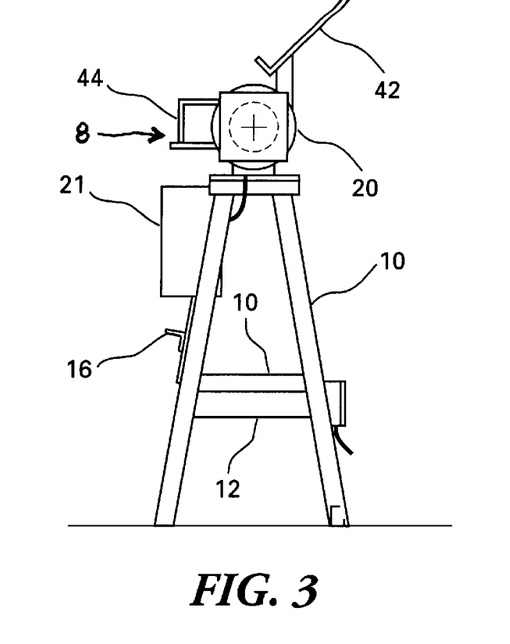
FIG. 3 is a right end view of the machine.

Turning to FIG. 3, which is and end view of the machine 8, one can see the narrow profile of the entire machine. The machine 8 does not take up a great deal of manufacturing space in an assembly plant. There is also illustrated a parts tray 42 mounted above the frame 10 on which the operator can place molding strips or other parts as necessary. There is also shown a safety shield 44 that covers the area where the moldings are actually installed. This is to keep the operator's hands out of the area where the moldings are slid onto the door panels and to keep the operator's hands away from the screw drive. There are electrical interlocks connected to the safety shield that disconnect the drive and render it inoperative when the safety shield is opened during the installation process or not closed at the beginning of the cycle.

Figure 4:
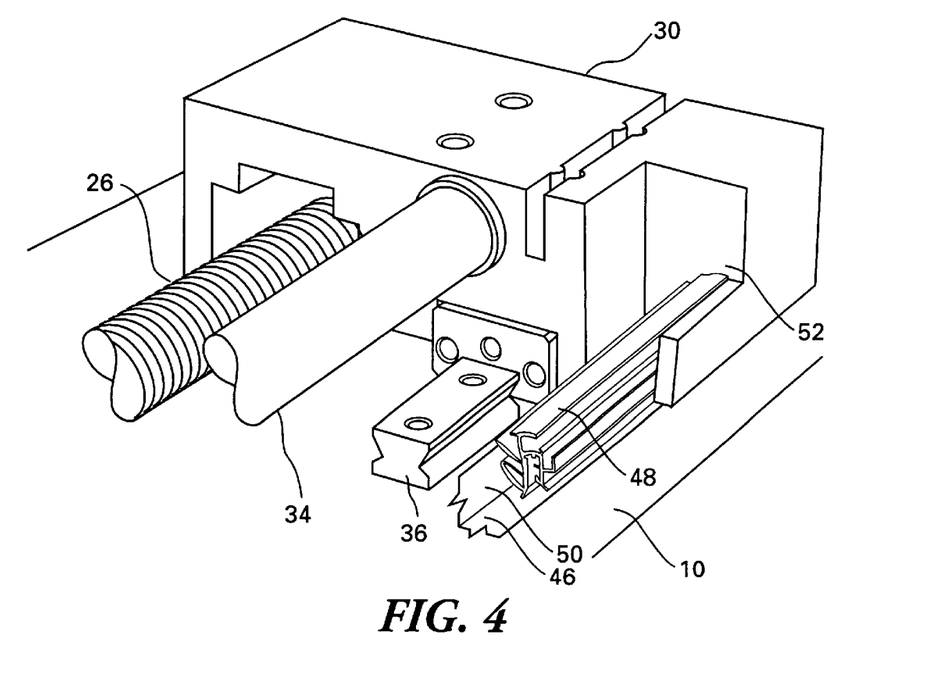
FIG. 4 is an enlarged perspective view of the push block assembly.

There is a molding strip rail 46 also mounted to the top of the frame 10. The strip rail 46 extends substantially the entire distance from the push block 30 to the guide block 32. It is designed to receive a molding strip 48 that is to be installed onto the door panel. As seen in FIG. 4, which is an enlarged view of the push block 30, the strip rail 46 has an upstanding tongue 50 that positions and supports the molding strip 48 in the proper orientation for installation.

The push block 30 also has a groove or channel 52 cut in its underside along its entire length. The groove 52 is dimensioned to receive the tongue 50 as the push block 30 moves along the block rail 36. The push block 30 engages the molding strip 48 and pushes it along the strip rail 46 and onto the door panel.

Figure 5:
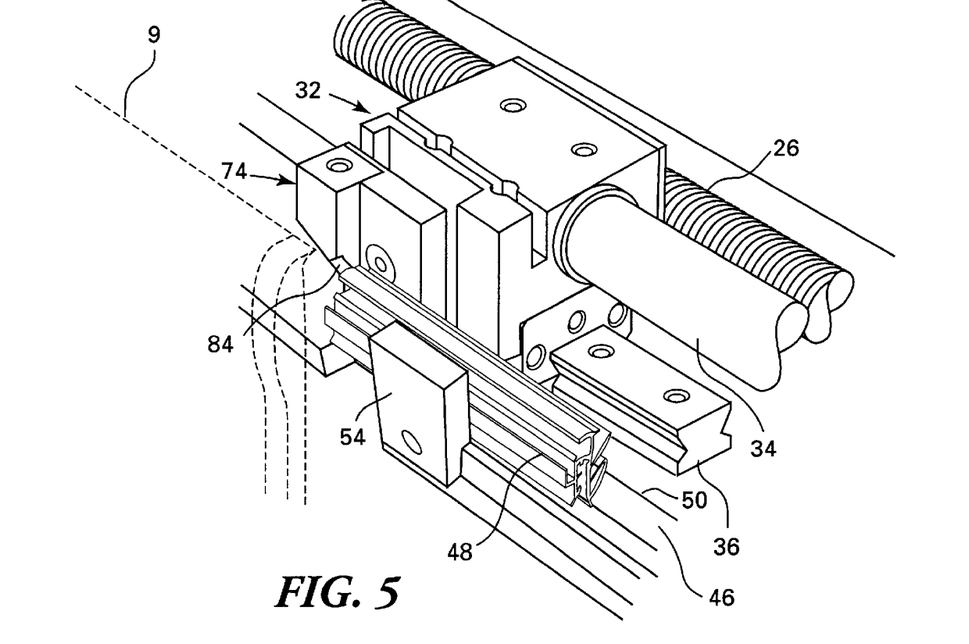
FIG. 5 is an enlarged perspective of the guide block assembly with the safety shield and other portions removed, at the beginning of its forward travel.
Figure 6:
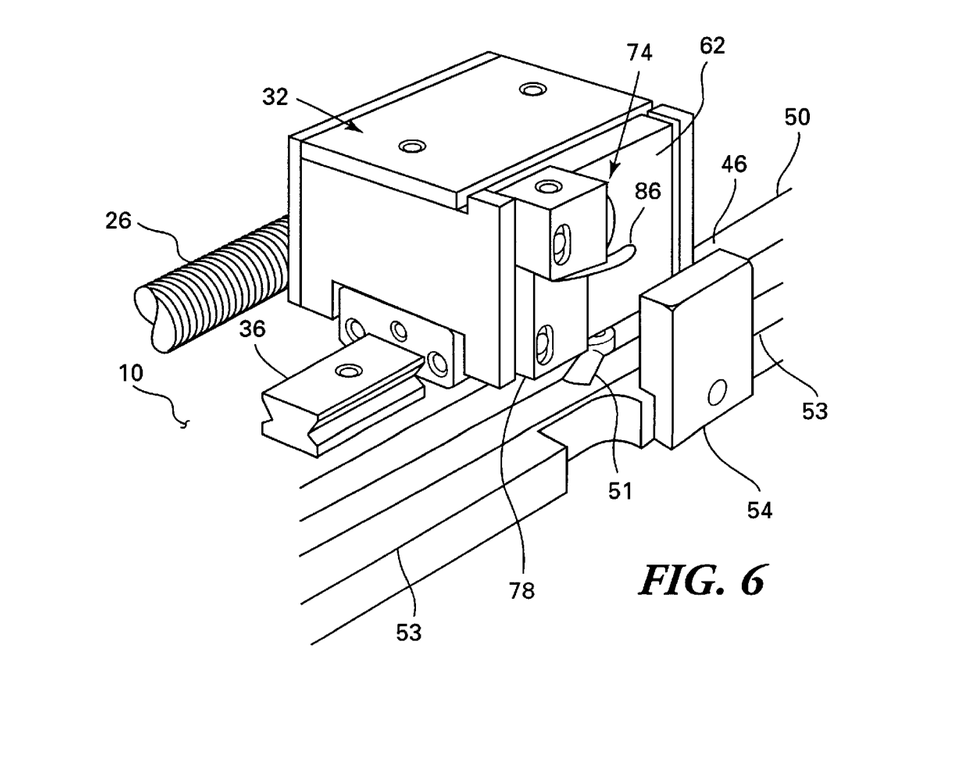
FIG. 6 is an enlarged perspective view of the guide block assembly and molding strip guide mounted on the machine frame.
Figure 7:
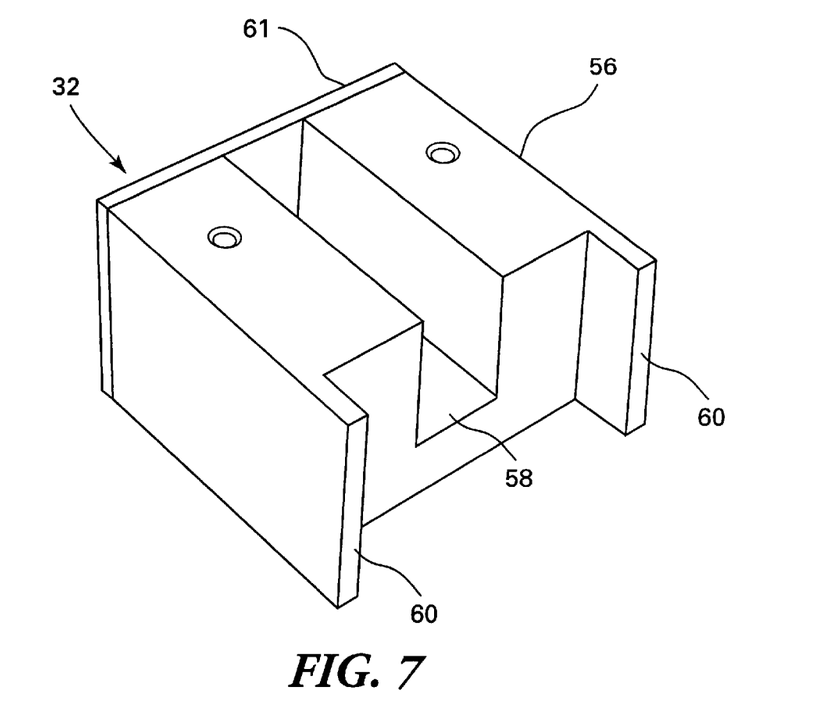
FIG. 7 is a front top perspective view of the guide block assembly.

As seen in FIGS. 5 and 6, the guide block 32 is located just behind the molding strip rail 46. A cam follower 51 (FIG. 6) is located at the front and bottom of the guide block 32. There is a track 53 on the top of the frame 10 that extends from the point of beginning to the end of the guide block's 32 travel. The cam follower 51 follows the track 53, which will be more fully described later. There is a guide post 54 mounted to the frame 10 in front of the molding strip rail 46. The molding strip 48 is received between the guide post 54 and the strip rail 46 with a top edge of the molding folded over the upstanding tongue 50. The folded top edge of the molding strip 48 extends over the tongue 50. This is the portion of the molding that is wrapped around the door panel with the vinyl or cloth material firmly captured between the folded top edge of the molding and the door panel. The folded top edge of the molding strip 48 catches on a lip on the door panel to lock the molding strip 48 to the door panel.

Figure 8:
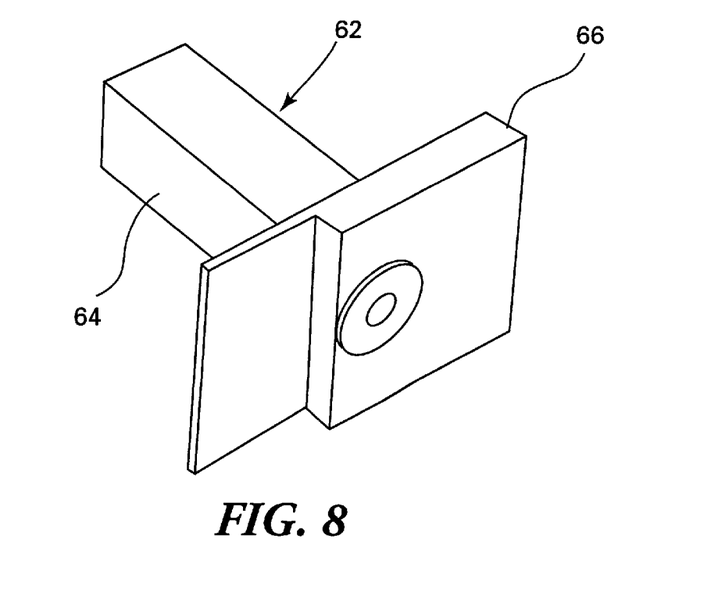
FIG. 8 is a side view of the T-shaped actuator portion of the guide block assembly.
Figures 9, 10, 11:
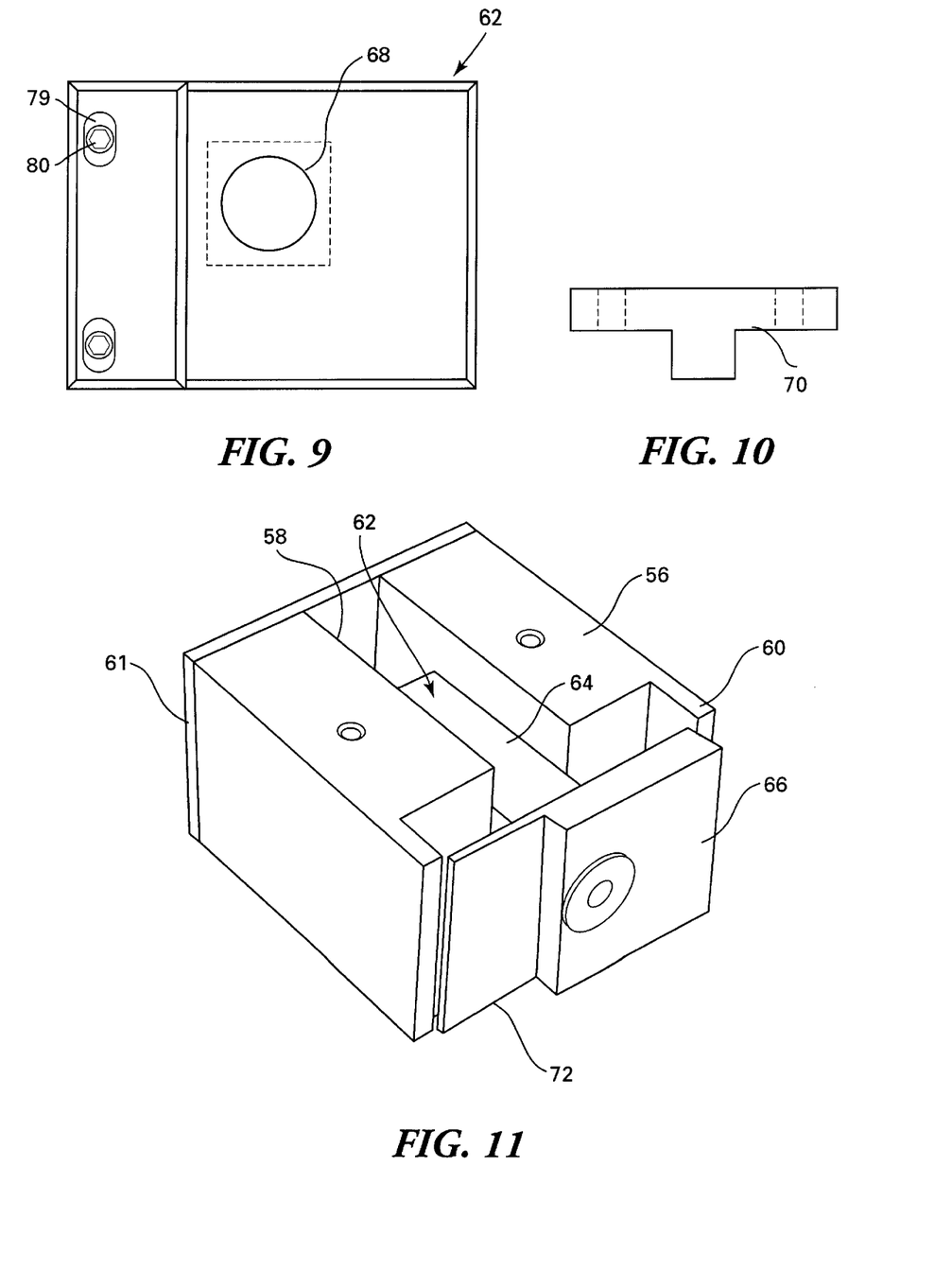
FIG. 9 is an end view of the T-shaped actuator of FIG. 8.
FIG. 10 is a front view of the guide block cover plate.
FIG. 11 is a left top perspective view of the guide block assembly and T-shaped actuator mechanism partially assembled.

The details of the guide block 32 are more clearly illustrated in FIGS. 7 through 13. The guide block 32 is made from a main block 56 that has a square channel 58 cut perpendicularly from one side to the other. There is a pair of arms 60 extending forward from and on either side of the main block 56. A back or end plate 61 is affixed to the rear of the block 56. FIG. 8 illustrates a T-shaped actuator 62 which is assembled from a square shaft 64 affixed to a moveable plate 66. The shaft 64 has a central circular passageway 68 as seen in FIG. 9. A spring (not illustrated) is positioned within the central passageway 68. A cover plate 70 (FIG. 10) is adapted to be mounted to the top of the main block 56. FIG. 11 illustrates how the T-shaped actuator 62 is received within the main block 56. The square shaft 64 is slidably received within the square channel 58. The shaft 64 can be lubricated to allow it to slide more easily. A square shaft is used to restrain any circular movement of the shaft 64 thus allowing the moveable plate 66 to move in only one axis. The spring in the passageway 68 pushes against the back plate 61 which forces the moveable plate 66 forward away from the main block 56.

Figure 12:
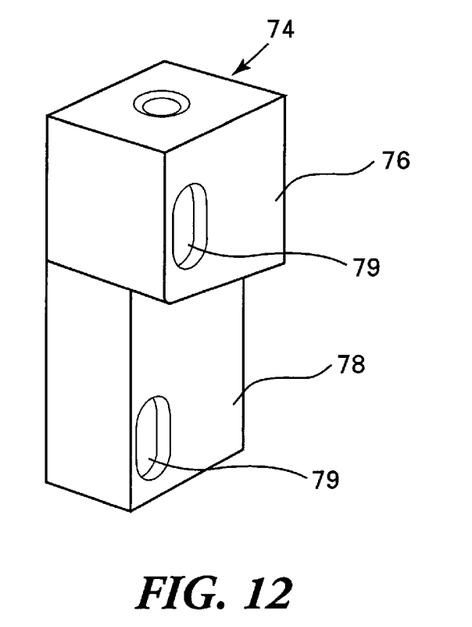
FIG. 12 is a perspective view of the finger mechanism holding block.
Figure 13:
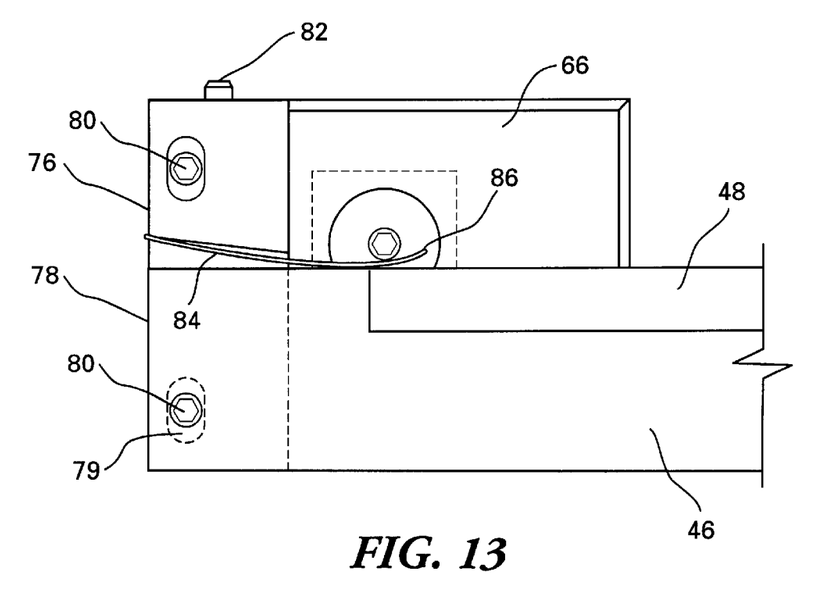
FIG. 13 is a front view with portions removed of the finger mechanism holding block in relationship to the molding strip during installation.

The moveable plate 66 has a recess 72. A finger holder 74 is securely mounted in the recess 72. As seen in FIG. 12, the finger holder is made up of two components, a top block 76 and a bottom block 78. As seen in FIG. 13, there are two mounting screws 80, that pass through holes 99 in the blocks 76 and 78 to fasten the finger holder 74 to the recess 72 in the moveable plate 66. It can also be seen in FIG. 13 that the top block 76 is mounted to the bottom block 78 by means of a long screw 82 that passes through the top block 76 and is received in a threaded passageway in the bottom block 78. Sandwiched between the top and bottom blocks 76 and 78 is a finger 84. The finger 84 is semi-rigid but will allow some flexing at its tip 86 when a downward pressure is exerted. The amount of pressure exerted by the finger 84 onto a door panel molding can be adjusted by tightening or loosening the long screw 82. The tip 86 is bent slightly upward to allow the molding strip 48 to be slid under the tip 86 for installation to the door panel.

Figure 14:
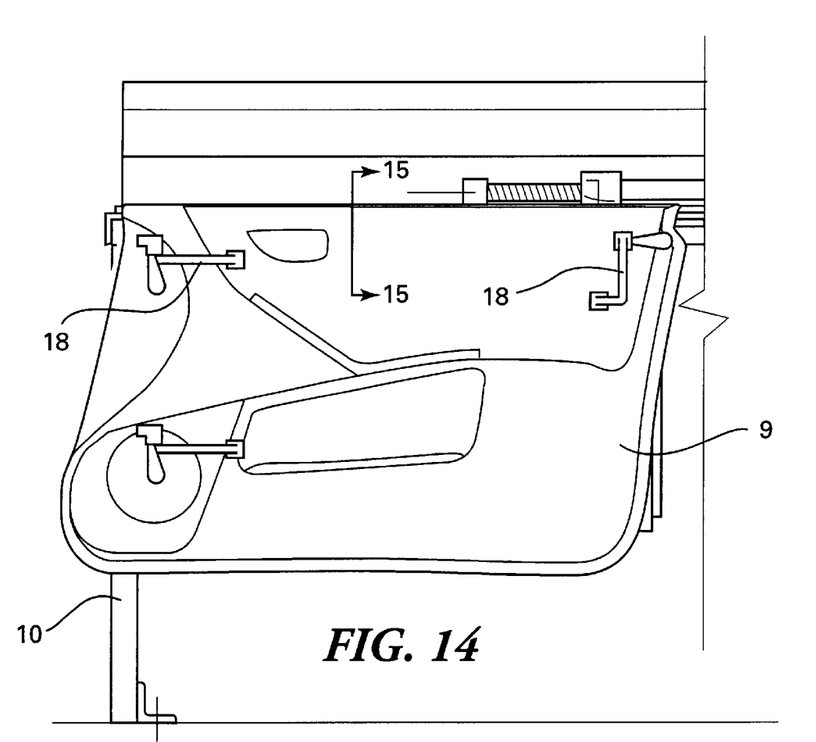
FIG. 14 is a front elevation view of the machine with portions removed of the door panel clamped to the machine.
Figure 15:
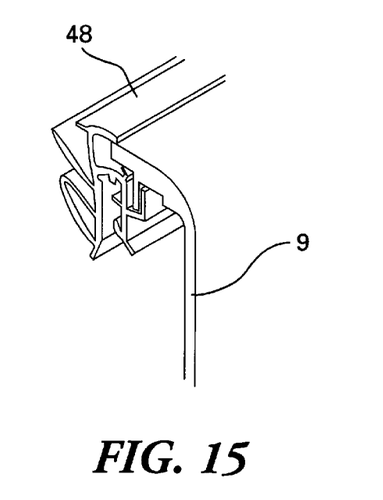
FIG. 15 is a perspective view taken along line 15—15 of FIG. 14 with portions removed of the molding installed on the car door panel.

The machine 8 is easy to operate. The operator first takes a door panel, locates it on the supports 16, and secures it to the frame by means of the clamps 18 as seen in FIG. 14. The molding strip 48 is placed on the molding strip rail 46 with the leading edge of the strip 48 slid under the tip 86 of the finger 84. The screw drive is started and the push block 30 begins pushing the molding strip 48 to the left (as seen in FIG. 1). At the same time the guide block 32 begins moving to the left along the top of the door panel. The moveable plate 66 is forced away from the main block 56 due to the T-shaped actuator being forced out as a result of the spring pushing against the back plate 61. The moveable plate 66 is guided away from the main block 56 by the cam follower 51 following the track 53 which is configured to move the plate 66 approximately ½ inch forward and away from the main block 56 during the first few inches of travel of the guide block 32.

Figure 16:
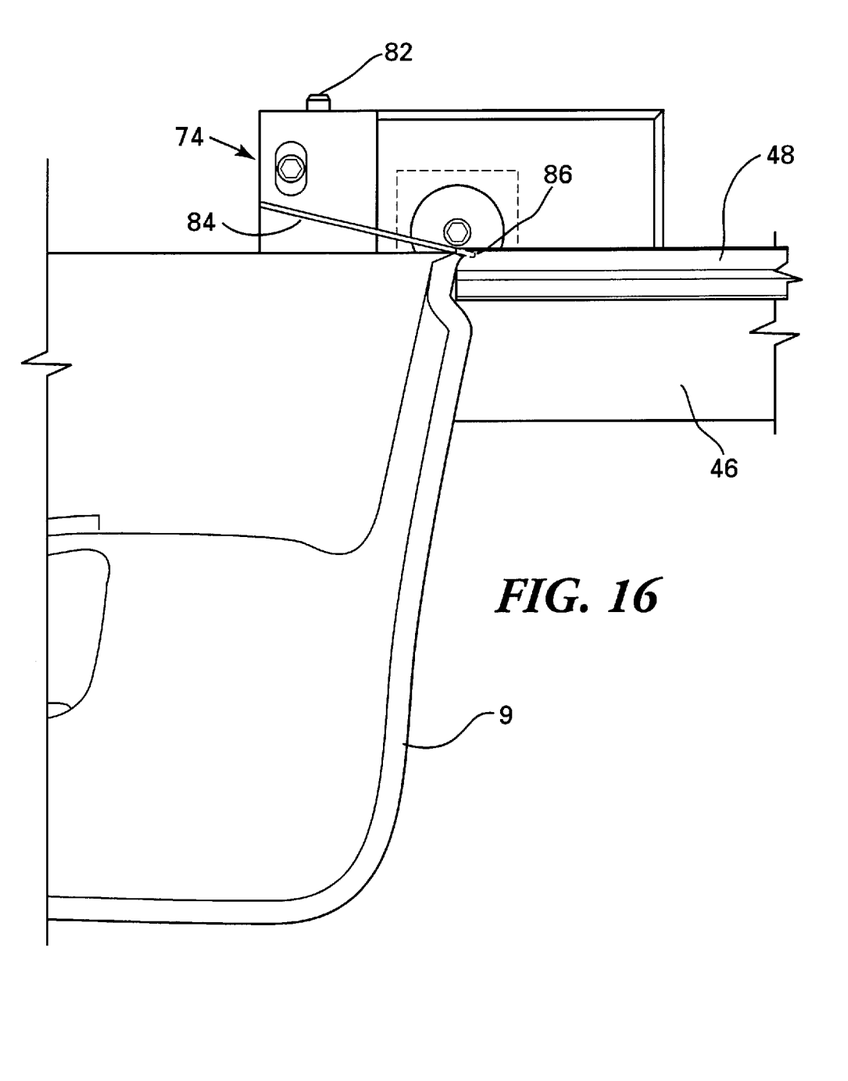
FIG. 16 is a front elevation view with portions removed for clarity showing the molding being installed onto the edge of the door panel with the finger pushing down on the door panel just ahead of the molding strip.
Figure 17:
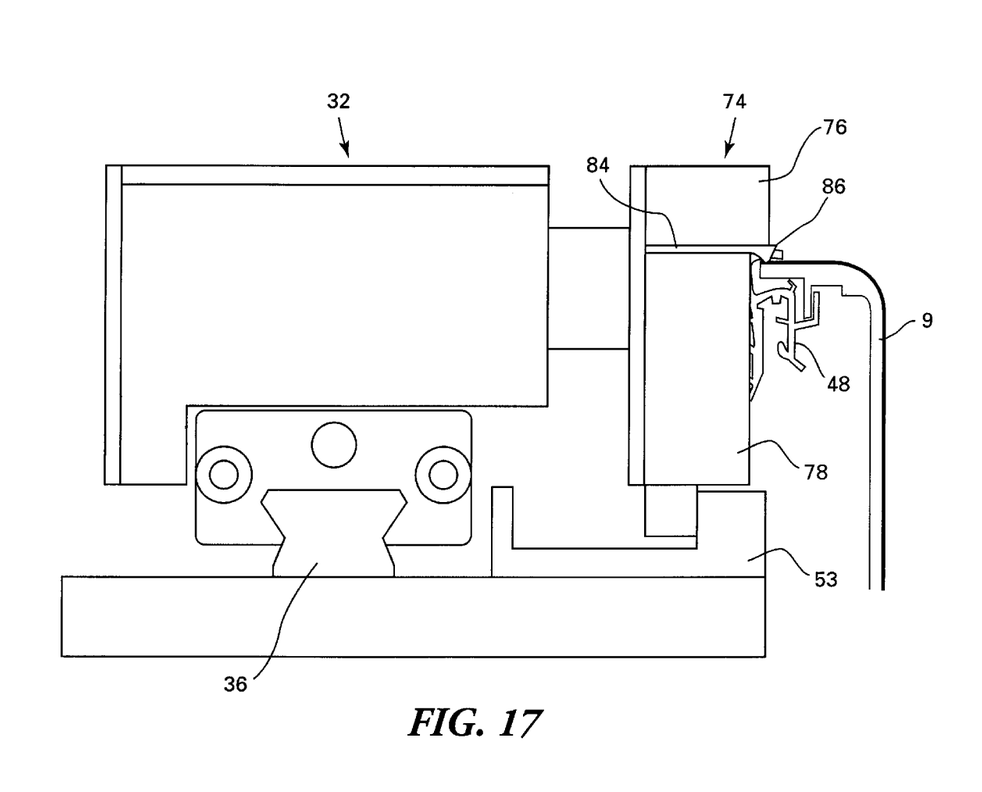
FIG. 17 is an enlarged end view with portions removed for clarity showing the Tshaped actuator and finger pushing on the door panel.

The movement of the moveable plate 66 toward the front of the machine 8 causes the plate 66 to apply a horizontal pressure against the vinyl or cloth material on the door panel. At the same time, the finger 84 applies a vertical force or pressure to the vinyl or cloth. The pressures are applied to the material at a point just in front of the leading edge of the molding strip 48. The combination of forces and the location where they are applied is critical to the success of the process. If the forces are applied too far forward of the leading edge of the molding strip, the material will ball or bunch up in front of the leading edge. This keeps the leading edge of the molding strip from sliding over the material and instead the molding strip will tear the material. Thus the material must be compressed in front of the leading edge as the strip is forced over the door panel. When the guide block 32 reaches the end of its travel, the molding strip 48 will have been installed along the entire length of the door panel. The clamps 18 are released and the door panel is removed. The push and guide blocks return to their original position and the cycle is repeated.

The machine 8 illustrated in FIG. 1 is designed for applying a molding strip on one of the inside door panels. A mirror image machine is needed to install the molding strip to the opposite door panel. In this manner the molding strips are always installed along the door panel in the same relative direction and in the same manner.

Thus there has been provided a method and apparatus for installing a molding strip to a door panel that fully satisfies the objects and advantages as set forth above. It is not intended to be exhaustive or to limit the invention to the particular embodiment disclosed. Obvious modifications or variations are possible to those skilled in the art in light of the above teachings. All such modifications and variations are within the broad scope of the invention as determined by the appended claims.

What is claimed is:

1. A machine for installing a molding strip having a leading end and a trailing end onto an edge of a door panel, the door panel having opposite ends and being covered with a soft. resilient material, the machine comprising:
   a frame assembly; means on the frame assembly for securely holding the door panel on the frame assembly;
   means for retaining the molding strip on the frame assembly with the leading end of the molding strip positioned adjacent to the edge and one end of the door panel;
   means for engaging the trailing end of the molding strip and for pushing the molding strip over the edge of the door panel along a path parallel to the edge of the door panel from one end of the door panel to the other end of the door panel; pressure applying means for applying a vertical and horizontal force to the soft resilient material to compress the material at a point in front of the leading end of the molding strip; and
   means to move the pressure applying means along the edge of the door panel to continually compress the material in front of the leading end of the molding strip as the strip moves from one end of the door panel to the other.

2. The machine of claim 1 wherein the pressure applying means comprises a flexible finger mechanism extending from a supporting block and means for moving the block in unison with the molding strip as the molding strip moves from one end of the door panel to the other, with the finger and supporting block engaging and compressing the material in front of the strip.

3. The machine of claim 1 wherein the means for pushing the molding strip comprises a drive mechanism having a pushing member that engages the trailing end of the molding strip and pushes the strip until the entire length of the molding strip is installed onto the edge of the door panel.

4. The machine of claim 3 and further comprising electrical stop means to stop the drive mechanism when the molding strip is fully installed onto the door panel edge.

5. The machine of claim 3 and further comprising means to automatically reverse the drive means after completing installation of the molding strip so that the drive means assumes it's original position and can repeat the cycle.

6. The machine of claim 3 wherein the drive means and pressure applying means are mechanically connected to move in unison as the strip is installed on the door panel edge.

7. A machine for installing a molding strip having a leading end and a trailing end and a channel therein onto an edge of a panel member in which the panel member is covered with a soft, resilient, flexible material, the machine comprising:
   a frame assembly having means for holding the panel member in a fixed position; support means on the frame assembly for holding the molding strip with the leading end of the molding strip adjacent to the edge of the panel;
   driving means for engaging the trailing end of the molding strip and pushing the strip along the edge of the panel along a path parallel to the edge of the door panel a distance at least equal to the length of the molding strip, the edge of the panel received within the molding strip channel;
   compression means mounted on the frame assembly for applying a vertical and horizontal compressive force to the soft, resilient, flexible material at a location in front of the leading end of the molding strip to compress the material thereby allowing the edge of the panel and the material to enter the molding strip channel without tearing the material; and
   means to move the compression means in unison with the driving means whereby the compression means continuously applies pressure during the installation of the molding strip to the soft. resilient material at a location in front of the moving strip.

8. The machine of claim 7 wherein the compression means comprises a flexible finger mechanism extending from a supporting block and means for moving the block moving in unison with the molding strip as the molding strip moves along the edge of the panel, with the finger and supporting block engaging and compressing the material in front of the strip by the application of the vertical and horizontal forces.

9. The machine of claim 7 wherein the driving means comprises a drive mechanism having a pushing member that engages one end of the molding strip and pushes the strip until the entire length of the molding strip is installed onto the edge of the door panel.

10. The machine of claim 9 and further comprising electrical stop means to stop the drive mechanism when the molding strip is fully installed onto the door panel edge.

11. The machine of claim 9 and further comprising means to automatically reverse the drive mechanism after completing installation of the molding strip so that the drive mechanism assumes it's original position and can repeat the cycle.

12. The machine of claim 8 lwherein the drive mechanism and compression means are mechanically connected to move in unison as the strip is installed on the door panel edge.

* * * * *

UNITED STATES PATENT AND TRADEMARK OFFICE
CERTIFICATE OF CORRECTION

PATENT NO.     : 6,205,651 B1
DATED          : March 27, 2001
INVENTOR(S)    : Warner It is certified that error appears in the above-identified patent and that said Letters Patent is hereby corrected as shown below:

Claim 1,
Line 4: change "." to --,-- after "soft"
Line 15: insert --,-- after "soft"

Claim 7,
Line 27: change "." to --,-- after "soft"

Claim 9,
Line 3: change "one" to -- the trailing --

Claim 12,
Line 1: change "81" to -- 9 --

Signed and Sealed this

Twenty-first Day of August, 2001

*Attest:*

*Nicholas P. Godici*

NICHOLAS P. GODICI
*Attesting Officer*    *Acting Director of the United States Patent and Trademark Office*